May 4, 1954

D. J. JORDAN 2,677,233

EXHAUST NOZZLE SWITCH RESPONSIVE
TO AFTERBURNER PRESSURE RATIO

Filed June 30, 1949

INVENTOR
DONALD J. JORDAN
BY Charles A. Warren
ATTORNEY

Patented May 4, 1954

2,677,233

UNITED STATES PATENT OFFICE 2,677,233

EXHAUST NOZZLE SWITCH RESPONSIVE TO AFTERBURNER PRESSURE RATIO

Donald J. Jordan, Glastonbury, Conn., assignor to United Aircraft Corporation, East Hartford, Conn., a corporation of Delaware Application June 30, 1949, Serial No. 102,313

2 Claims. (Cl. 60—35.6)

1

This invention relates to a pressure switch, particularly to a switch adapted to control mechanism for regulating the area of an exhaust or thrust nozzle.

A feature of this invention is a control switch which provides a signal in response to a change in the ratio of three pressures applied across the switch.

An afterburner is a device at present employed for augmenting the thrust of a turbojet power plant and is mounted downstream of the turbine rotor. The components of an afterburner consist of a diffuser in which the velocity of the gases is decreased to a value suitable for combustion and a chamber where combustion occurs. Also, it is desirable to employ a variable area exhaust nozzle and it is the purpose of this invention to provide a control switch for regulating the area of this exhaust nozzle.

A feature of this invention is a control switch which provides a signal for opening the exhaust nozzle on an afterburner when combustion has been established within the afterburner combustion chamber.

A feature of this invention is a control switch which provides a signal for closing the exhaust nozzle on an afterburner when combustion ceases in the afterburner combustion chamber.

When combustion is established within an afterburner, the volume of hot gases passing through the exhaust nozzle increases and a large exhaust nozzle area is required. Should combustion in the afterburner cease due to blowout of the flame, malfunctioning of the equipment or even when it is halted by the power plant operator, a smaller exhaust nozzle area is required to prevent loss of thrust. The control switch described herein is designed to sense the presence of combustion and to regulate the exhaust nozzle area accordingly.

Combustion within a confined moving gas stream results in a drop in pressure across the combustion region. This pressure drop is associated with the difference in momentum of the air entering and leaving the region in which heat is added and it can be used as an indication of when combustion is occurring within the afterburner. In a typical combustion chamber the pressure change is usually the sum of the pressure drop due to the addition of heat, called the momentum pressure drop, and a change in pressure due to the geometry of the combustion chamber. At different engine speeds, flight speeds and altitudes, the pressure change across a typical combustion chamber varies widely both

2 with and without combustion. A feature of this invention is a control switch which provides automatic compensation for such changes and provides a signal which will indicate whether a momentum drop exists due to the addition of heat.

Other features and advantages will be apparent from the specification and claims and from the accompanying drawings which illustrate an embodiment of the invention.

In the drawings,

Fig. 3 is a diagrammatic view of the control switch in conjunction with a turbojet afterburner and shows the use of a sonic nozzle with the switch.

Figure 1:
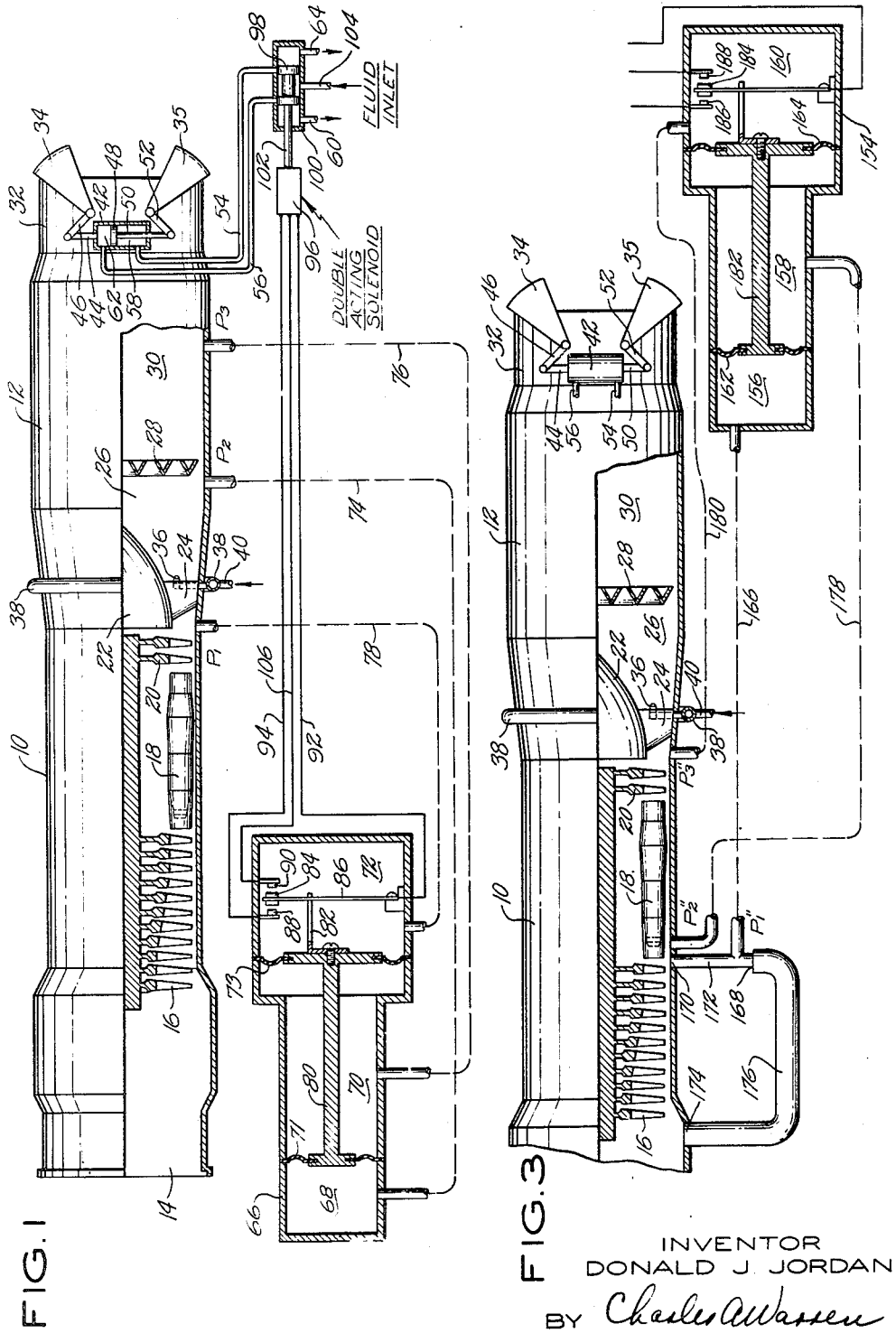
Fig. 1 is a diagrammatic view of the control switch in conjunction with a turbojet having an afterburner and shows the means for regulating the variable area exhaust nozzle on the afterburner.

Referring to the drawings in detail, in Fig. 1 there is shown a turbojet power plant 10 having an afterburner 12. The turbojet generally is composed of inlet 14, compressor 16, combustion chamber 18, turbine 20 and inner fairing 22. The inner fairing is supported within the power plant by means of several struts, one of the struts being indicated at 24. The afterburner generally is composed of diffuser chamber 26, flame holder 28, combustion chamber 30 and tailpipe 32. The tailpipe is provided with eyelids 34 and 35 which move together or apart to vary the area of the exhaust or thrust nozzle defined by the eyelids.

Fuel for the afterburner combustion chamber 30 is admitted to the gas stream through fuel nozzles 36 within the trailing edge of the several supporting struts 24. Fuel may be supplied to these nozzles by means of annular conduit 38 which is connected through conduit 40 to a source not shown.

Regulation of the area of the exhaust nozzle is accomplished by means of floating cylinder 42. The cylinder itself is attached by shaft 44 and arm 46 to the upper eyelid 34. A piston 48 is provided within the cylinder and is attached by piston rod 50 and arm 52 to the lower eyelid 35. Fluid is supplied to opposite sides of the piston 48 by means of conduits 54 and 56, conduit 54 being connected to chamber 58, and conduit 56 being connected to chamber 62. Thus, the eyelids are caused to assume a closed position, giving the smallest exhaust nozzle area, when fluid is admitted to chamber 62, and the eyelids are caused to assume an open position, giving the maximum exhaust nozzle area when fluid is admitted to chamber 58. Regulation of the fluid supply to these two chambers is described below.

Pressures at three different stations along the path of the gases through the power plant are used by the control switch 66 to sense combustion within the afterburner and to regulate the exhaust nozzle area accordingly. These stations are indicated at $P_1$ which is the static pressure immediately downstream of the turbine 20, $P_2$ which is the static pressure ahead of the flame holder 28, and $P_3$ which is the static pressure on the downstream side of afterburner combustion chamber 30. Pressures $P_1$ and $P_2$ are the reference pressures, the ratio between them being constant. The ratio of $P_1$ to $P_3$ or $P_2$ to $P_3$ varies with combustion within the afterburner. The pressure ratio of $P_1$ to $P_2$ and $P_1$ to $P_3$, and also the ratio of the pressure differences $P_1-P_2$ and $P_1-P_3$ will remain constant as long as the eyelids 34 and 35 are in a closed position and combustion is not occurring within the afterburner. However, when combustion occurs, $P_1$ and $P_2$ will increase more than $P_3$, resulting in a change in the pressure ratio.

The control switch 66 is divided into three chambers as shown at 68, 70 and 72. Chambers 68 and 70 are separated by flexible diaphragm 71 and chambers 70 and 72 are separated by flexible diaphragm 73. Chamber 68 is connected by line 74 to pressure station $P_2$, chamber 70 is connected by line 76 to pressure station $P_3$, and chamber 72 is connected by passage 78 to pressure station $P_1$. Diaphragms 71 and 73 are connected by a rigid rod 80 which, through actuator 82 attached to the rod and located within chamber 72, moves electrical contact 84, carried by leaf 86, whenever the diaphragm assembly moves. Movement of the diaphragm assembly to the left closes electrical contacts 84 and 88, and movement of the diaphragm assembly to the right closes electrical contacts 84 and 90. When contacts 84 and 88 are closed, a circuit including wires 92 and 94 and double-acting solenoid 96 is completed and the solenoid is energized. This causes piston 98 within solenoid actuated valve 100, the piston being connected to the solenoid by means of rod 102, to move to the right admitting fluid from inlet conduit 104 to conduit 54 and to chamber 58 causing the eyelid control to open and increase the area of the exhaust nozzle. Closing of contacts 84 and 90 completes a circuit including wires 92 and 106 and energizes solenoid 96 so that piston 98 is caused to move to the left. This will admit fluid from inlet conduit 104 to conduit 56 and chamber 62 causing the eyelid control to close and decrease the area of the exhaust nozzle. When fluid is admitted to conduit 54, conduit 56 is vented to drain 60 and when fluid is admitted to conduit 56, conduit 54 is vented to drain 64.

The control switch 66 operates on the following principle; in a confined gas stream the Mach number at any point in the stream bears a definite relationship to the Mach number at any other point provided no energy is taken from or added to the gas stream between the points in question. Thus if the Mach number at one point is fixed, the Mach number at all other points is fixed, and the ratios of any static or total absolute pressures in the stream are fixed. If the ratio of the absolute pressures is fixed, the ratio of the pressure differences between any points in the stream is also fixed.

Thus, at a constant value of stream Mach number, the forces will be balanced. If the Mach number is changed or if energy is added or subtracted from the stream between the pressure stations, the forces will be unbalanced. When combustion occurs within the afterburner combustion chamber 30, the pressure balance is disturbed and the ratio of $$\frac{P_1-P_3}{P_2-P_3}$$

is changed to the extent that the diaphragm assembly will move in accordance with the pressure change. When combustion ceases in the afterburner, the pressure ratio will change to another value and the diaphragm assembly will be caused to move in the opposite direction. This pressure ratio will remain essentially constant with variations in the velocity head in the afterburner due to changes in flight speed, altitude, or engine speed. The area ratio of the diaphragms is chosen to be halfway between the value of $$\frac{P_1-P_2}{P_2-P_3}$$

with combustion and the ratio of $$\frac{P_1-P_2}{P_2-P_3}$$

without combustion so that the switch is balanced when $(P_1-P_3)$ (area of diaphragm 73) =
$(P_2-P_3)$ (area of diaphragm 71)

Figure 2:
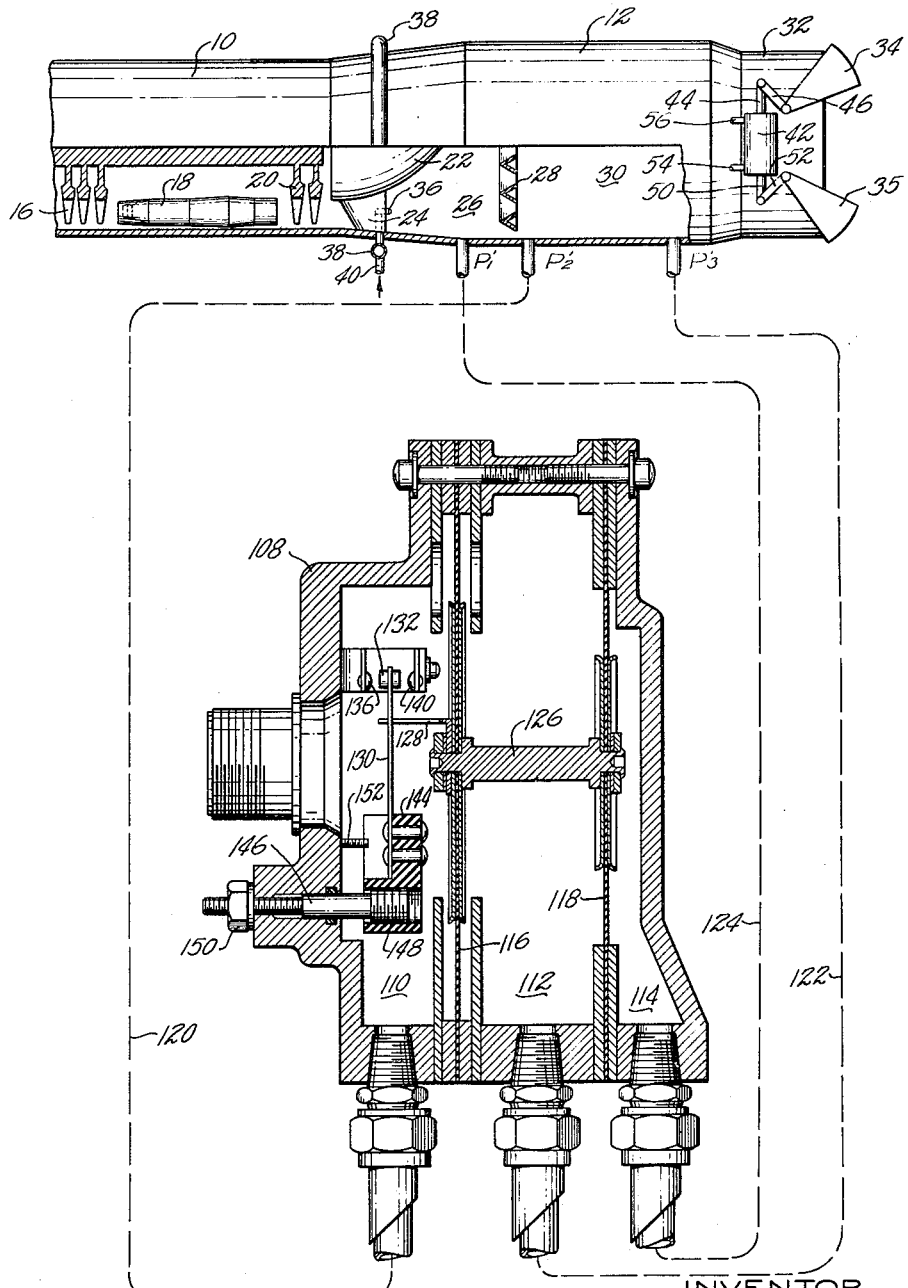
Fig. 2 is a sectional view of a control switch in conjunction with a turbojet afterburner.

Fig. 2 illustrates a control switch 108 constructed in accordance with this invention as applied to the diagrammatic form of the turbojet power plant shown in Fig. 1. The pressures which actuate this switch, however, are different from those employed with the switch of Fig. 1 and serve to illustrate how various combinations of pressure stations can be used with this switch provided that the ratio of the pressures $P_1$ and $P_2$ is fairly constant. The turbojet unit is shown at 10, the unit having an afterburner 12 comprising diffuser chamber 26, flame holder 28 and combustion chamber 30. In this modification, pressure station $P_1'$ is the static pressure of the diffuser chamber 26. Pressure station $P_2'$ is the static pressure immediately downstream of flame holder 28, and pressure station $P_3'$ is the static pressure on the downstream side of afterburner combustion chamber 30.

The control switch 108 is divided into three chambers as shown at 110, 112 and 114. Chambers 110 and 112 are separated by flexible diaphragm 116 and chambers 112 and 114 are separated by flexible diaphragm 118. Chamber 110 is connected by line 120 to pressure station $P_2'$, chamber 112 is connected by line 122 to pressure station $P_3'$, and chamber 114 is connected by line 124 to pressure station $P_1'$. Diaphragms 116 and 118 are connected by a rigid rod 126, the diaphragms being supported between cups on either end of the rod. An actuator 128 is affixed to the left end of the rod 126 within chamber 110 and moves leaf 130 carrying electrical contact 132 whenever the diaphragm assembly moves. Movement of the diaphragm assembly to the left closes electrical contacts 132 and 136 to complete a circuit which energizes a solenoid and closes the eyelids 34 and 35 in a manner similar to that described in connection with Fig. 1. Movement of the diaphragm assembly to the right closes electrical contact 132 and contact 140 to complete a circuit which opens the eyelids 34 and 35 to decrease the area of the exhaust nozzle.

Leaf 130 is mounted on insulating block 144 which in turn is attached to shaft 146 by means of threads 148. Shaft 146 has a notch, not shown, at its lefthand end so that upon loosening nut 150 the shaft and the insulating block can be moved to adjust the position of the contact 132 between the contacts 136 and 140 after the switch 103 has been assembled. Pin 152 is provided to prevent rotation of the insulated block 144 while the adjustment is being made.

In Fig. 3 another arrangement of the control switch as applied to a turbojet having an afterburner is shown. Here a sonic nozzle is employed with the switch. The switch is shown at 154 and is divided into three chambers as shown at 156, 158 and 160. Chambers 156 and 158 are separated by flexible diaphragm 162 and chambers 158 and 160 are separated by flexible diaphragm 164. Chamber 156 is connected by line 166 to pressure station $P_1''$ which is the static pressure in the throat of a sonic nozzle 168 connected to compressor discharge pressure at 170 by means of conduit 172. Air flow from this nozzle is conducted back to the compressor inlet 174 by means of conduit 176. Chamber 158 is connected by means of line 178 to pressure station $P_2''$ which is the compressor discharge static pressure. Chamber 160 is connected by means of line 180 to pressure station $P_3''$ which is turbine discharge static pressure.

The ratio of pressure $P_1''$ to $P_2''$ is always the sonic ratio while the pressure ratio $P_2''$ to $P_3''$ is the value for the specific engine. The two pressure ratios will remain constant as will the ratio of the pressure differences as long as the eyelids 34 and 35 are in a closed position and there is no combustion within the afterburner. When combustion occurs, pressure $P_3''$ will rise and pressure $P_1''$ and pressure $P_2''$ will be unchanged. Conversely, when combustion ceases, pressure $P_3''$ will drop.

When a change in the ratio of the pressure differences occurs, the diaphragm assembly 182 will be caused to move to the right or to the left to close electrical contact 184 with electrical contacts 186 or 188 which will energize a solenoid, not shown, to regulate the eyelids in a manner similar to that described in connection with Fig. 1.

In the system shown in Fig. 3, it is necessary to provide a reset so that the system will not cycle, it may be necessary to use two control switches, one set to open the eyelids 34 and 35 as the result of a moderate decrease in pressure ratio $$\frac{P_2-P_3}{P_2-P_1}$$

and the other set to close the eyelids at a relatively large increase in this pressure ratio.

Since the control switch has little or no spring rate, it is highly sensitive and can be made to respond accurately to changes in pressure ratio of less than 1 percent at high altitudes.

It is to be understood that the invention is not limited to the embodiments herein illustrated and described but may be used in other ways without departure from the spirit as defined by the claims.

I claim:

1. A jet engine including a compressor, a turbine driving said compressor, a combustion chamber receiving compressed air from the compressor and supplying combustion gases to drive said turbine, an afterburner receiving combustion gases from said turbine and compressor and having mounted on its downstream end a nozzle through which the combustion gases are discharged, means for varying the area of said nozzle, and pressure responsive means controlling said nozzle area varying means including a housing having three chambers therein defined by interconnected diaphragms of different areas, three pressure stations at spaced points along the gas path through said afterburner, one station located adjacent the turbine end of said afterburner, another station located in the downstream portion of said afterburner, and the third station located between and spaced from said other stations, and a fluid connection between each of said chambers and one of said stations so that nozzle area is controlled as a function of pressure ratio in said afterburner.

2. A jet engine including a compressor, a turbine driving said compressor, a combustion chamber receiving compressed air from the compressor and supplying combustion gases to drive said turbine, an afterburner receiving combustion gases from said turbine and compressor and having mounted on its downstream end a nozzle through which the combustion gases are discharged, said afterburner including a diffuser and a flame holder, means for varying the area of said afterburner nozzle, and pressure responsive means controlling said nozzle area varying means including a housing having three chambers therein defined by interconnected diaphragms of different areas, one chamber having a fluid connection with said diffuser, another with the downstream side of said flameholder, and the third with the downstream portion of said afterburner, and a switch connected to and actuated by movement of said interconnected diaphragms to automatically control said nozzle area varying means and adjust nozzle area as a function of pressure ratio in said afterburner.

References Cited in the file of this patent

UNITED STATES PATENTS

| Number | Name | Date |
|---|---|---|
| 2,444,163 | Kocmich | June 29, 1948 |
| 2,452,500 | Smith | Oct. 26, 1948 |
| 2,457,595 | Orr | Dec. 28, 1948 |
| 2,483,401 | Cole | Oct. 4, 1949 |
| 2,498,939 | Bobier, Jr. | Feb. 28, 1950 |
| 2,514,248 | Lombard | July 4, 1950 |
| 2,520,967 | Schmitt | Sept. 5, 1950 |
| 2,537,772 | Lundquist | Jan. 9, 1951 |
| 2,540,594 | Price | Feb. 6, 1951 |
| 2,545,703 | Orr | Mar. 20, 1951 |
| 2,566,961 | Poole | Sept. 4, 1951 |
| 2,580,962 | Sédille | Jan. 1, 1952 |

FOREIGN PATENTS

| Number | Country | Date |
|---|---|---|
| 587,558 | Great Britain | May 3, 1947 |